United States Patent
Li et al.

(10) Patent No.: US 11,768,508 B2
(45) Date of Patent: Sep. 26, 2023

(54) UNMANNED AERIAL VEHICLE SENSOR ACTIVATION AND CORRELATION SYSTEM

(71) Applicant: Skydio, Inc., Redwood, CA (US)

(72) Inventors: Hui Li, San Francisco, CA (US); John Bressler, San Francisco, CA (US); Volkan Gurel, San Francisco, CA (US); Bernard J. Michini, San Francisco, CA (US)

(73) Assignee: Skydio, Inc., Redwood City, CA (US)

( * ) Notice: Subject to any disclaimer, the term of this patent is extended or adjusted under 35 U.S.C. 154(b) by 1452 days.

(21) Appl. No.: 15/042,630

(22) Filed: Feb. 12, 2016

(65) Prior Publication Data
US 2018/0109767 A1    Apr. 19, 2018

Related U.S. Application Data

(60) Provisional application No. 62/116,303, filed on Feb. 13, 2015.

(51) Int. Cl.
*H04N 5/232* (2006.01)
*H04N 7/18* (2006.01)
(Continued)

(52) U.S. Cl.
CPC ......... *G05D 1/101* (2013.01); *G01C 21/1656* (2020.08); *G05D 1/0038* (2013.01);
(Continued)

(58) Field of Classification Search
CPC . B64C 2201/127; B64C 39/02; B64C 39/024; B64C 2201/123; G01C 21/165;
(Continued)

(56) References Cited

U.S. PATENT DOCUMENTS 8,527,115 B2   9/2013   Greenfeld et al.
8,717,361 B2   5/2014   Sasakawa et al.
(Continued)

FOREIGN PATENT DOCUMENTS

KR   2011-0134076 A   12/2011

OTHER PUBLICATIONS

International Search Report and Written Opinion of the International Searching Authority for International Application No. PCT/US2016/017882, dated Jun. 23, 2016, 15 pages.
(Continued)

*Primary Examiner* — Christopher S Kelley
*Assistant Examiner* — Kathleen M Walsh
(74) *Attorney, Agent, or Firm* — Young Basile Hanlon & MacFarlane, P.C.

(57) ABSTRACT

Methods, systems, and apparatus, including computer programs encoded on computer storage media, for a sensor activation and correlation system. One of the methods includes obtaining information describing a flight plan for implementation. A trigger associated with activating a camera included in an unmanned aerial vehicle (UAV) is determined to be satisfied. Information indicating that the camera is to capture an image is provided to the camera. A first timestamp associated with the image is obtained and stored. Information indicating that the image was captured is received and associated with the obtained first timestamp. Information indicating that the camera captured the image is provided to a user device in communication with the UAV.

19 Claims, 8 Drawing Sheets

(51) Int. Cl.
*G05D 1/10* (2006.01)
*H04N 5/33* (2023.01)
*G01C 21/16* (2006.01)
*G05D 1/00* (2006.01)
*B64C 39/02* (2023.01)

(52) U.S. Cl.
CPC ......... *H04N 5/232* (2013.01); *H04N 5/23203* (2013.01); *H04N 5/23222* (2013.01); *H04N 5/33* (2013.01); *H04N 7/185* (2013.01); *H04N 7/188* (2013.01); *B64C 39/024* (2013.01); *B64C 2201/123* (2013.01); *B64C 2201/127* (2013.01)

(58) Field of Classification Search
CPC .. G05D 1/0038; G05D 1/101; H04N 5/23203; H04N 5/23206; H04N 5/23222; H04N 5/33; H04N 7/185; H04N 7/188; H04N 5/232
USPC .......................................................... 348/144
See application file for complete search history.

(56) References Cited

U.S. PATENT DOCUMENTS

| | | | |
|---|---|---|---|
| 8,975,585 B2 | 3/2015 | Hiebl | |
| 9,075,415 B2 | 7/2015 | Kugelmass | |
| 9,256,225 B2 | 2/2016 | Downey et al. | |
| 9,256,994 B2 | 2/2016 | Downey et al. | |
| 9,273,981 B1 | 3/2016 | Downey et al. | |
| 9,310,221 B1 | 4/2016 | Downey et al. | |
| 9,311,760 B2 | 4/2016 | Downey et al. | |
| 9,340,283 B1 | 5/2016 | Downey et al. | |
| 9,903,719 B2* | 2/2018 | Hunter, Jr. | G01S 19/45 |
| 2004/0143602 A1 | 7/2004 | Ruiz et al. | |
| 2010/0013927 A1* | 1/2010 | Nixon | G01C 11/06 348/E7.085 |
| 2010/0157055 A1 | 6/2010 | Pechatnikov | |
| 2010/0228418 A1* | 9/2010 | Whitlow | H04N 7/188 701/25 |
| 2010/0305782 A1* | 12/2010 | Linden | H04N 5/772 396/419 |
| 2011/0035149 A1 | 2/2011 | Mcandrew et al. | |
| 2011/0137547 A1 | 6/2011 | Kwon et al. | |
| 2011/0208373 A1 | 8/2011 | Lees et al. | |
| 2011/0234796 A1 | 9/2011 | Taber | |
| 2012/0123628 A1 | 5/2012 | Duggan et al. | |
| 2012/0299751 A1 | 11/2012 | Verna et al. | |
| 2014/0226024 A1* | 8/2014 | Limbaugh | H04N 5/23216 348/169 |
| 2014/0267777 A1 | 9/2014 | Le Clerc et al. | |
| 2014/0316614 A1 | 10/2014 | Newman | |
| 2014/0316616 A1* | 10/2014 | Kugelmass | G08G 5/0039 701/8 |
| 2014/0336928 A1* | 11/2014 | Scott | G01M 5/0033 701/468 |
| 2014/0347482 A1 | 11/2014 | Weinmann et al. | |
| 2015/0192928 A1 | 7/2015 | Sastre | |
| 2017/0102467 A1* | 4/2017 | Nielsen | G01S 19/485 |

OTHER PUBLICATIONS

U.S. Appl. No. 15/004,411, filed Jan. 22, 2016, Downey et al.
U.S. Appl. No. 15/019,165, filed Feb. 9, 2016, Downey et al.

* cited by examiner

200
Actuator Control Module 204

[Change PWM Range]   [Test Motors]

Actuator Control Module
[Blink]
v0.8.1
Serial #: 3538972
Port PWM Rate ⓘ
[50Hz ▾]
Power Bus ⓘ
[Safety Critical (A-Bu ▾]

| Port | Mode | Attached Device |
|---|---|---|
| Port 1 | SBUS Input ▾ | SBUS Device |
| Port 2 | PWM Output ▾ | MOTOR 2 ▾ |
| Port 3 | PWM Output ▾ | MOTOR 3 ▾ |
| Port 4 | PWM Camera ▾ | Camera |
| 202 | Not Configured | |
| | PWM Output | |
| | PWM Camera | |
| | Pulse Camera | 206 |

FIG. 2

UNMANNED AERIAL VEHICLE SENSOR ACTIVATION AND CORRELATION SYSTEM

BACKGROUND

Payload modules, including sensors (e.g., cameras), are frequently included in unmanned aerial vehicles (UAVs) to obtain real-world information of particular geographic areas. For instance, a UAV can capture images of an event, building, vehicle, or natural landscape features from unique perspectives. Subsequent to the event, the images can be obtained from the UAV and provided to one or more recipients.

SUMMARY

Particular embodiments of the subject matter described in this specification can be implemented so as to realize one or more of the following advantages. Images taken by an imaging device (e.g., a visible light, UV, or infrared camera) during a flight of an unmanned aerial vehicle (UAV) can be precisely described, including an associated timestamp and geolocation information of the UAV for each image capture. The taken images (which may include images with overlapping fields of view) can be combined together (e.g., stitched) utilizing, in part, the associated timestamps and geolocation information to generate a combined image (e.g., a geo-rectified image, which may be a panorama image and/or a high-resolution image) useful to a subsequent flight or to a reviewing user. Unmanned Aerial Vehicles (UAVs) used for inspections may for example take photos with a frequency of about 1 photo per 1-3 seconds. These photos may be processed after a flight (or via onboard processing), and processing steps use the geospatial coordinates and camera pose of an image in a collected data set.

Optionally, during a flight of the UAV, upon taking an image, the UAV can provide information to a user device (e.g., a fixed or mobile terminal such as a ground control station) of a user (e.g., an operator) that monitors progress of, or provides instructions to, the UAV indicating that the image was taken. Additionally, optionally the UAV can determine whether the taken image has or is likely to have an associated quality score (or other measurement parameter) less than a threshold, and can automatically re-take the image if the quality score is less than the threshold score. Similarly, the UAV can optionally provide information to the user device indicating a successful image capture, or an unsuccessful image capture—indicating that the UAV will re-take the image. In addition to information indicating an image capture, the UAV can also provide a reduced resolution version of a taken image, and the user device can quickly determine whether an associated quality score is less than a threshold. Upon determining that the quality score is less than a threshold, the user device can provide information to the UAV to re-take an image. In this way, the UAV and user device can interact with each other to monitor the image taking progress during a flight, and ensure that the quality of the taken images is adequate.

In general, one optional innovative aspect of the subject matter described in this specification can be embodied in methods that include the actions of obtaining information describing a flight plan for implementation; determining that a trigger associated with activating a camera included in the UAV is satisfied; providing, to the camera, information indicating that the camera is to capture an image; obtaining a first timestamp associated with providing information to the camera and/or a second timestamp from the camera indicating when an image was captured, and storing the first timestamp; receiving, from the camera, information indicating that the image was captured, and associating the image with the obtained first timestamp and/or second timestamp; and providing, to a user device in communication with the UAV, information indicating that the camera captured the image, wherein the user device monitors the UAV during implementation of the flight plan.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

FIG. 2 illustrates an example user interface for configuring a UAV to interface with a camera to be included in the UAV.

Like reference numbers and designations in the various drawings indicate like elements.

DETAILED DESCRIPTION

Figure 1:
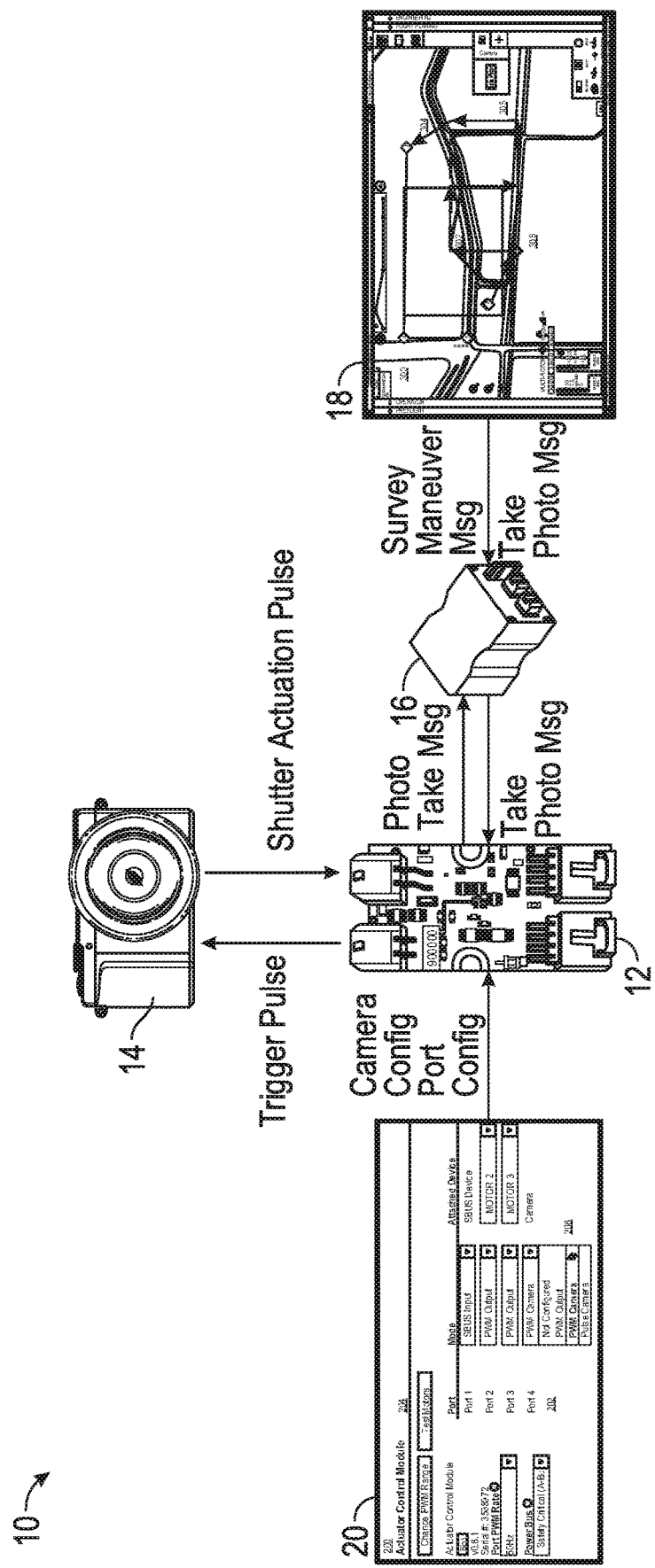
FIG. 1 illustrates an example block diagram of systems associated with capturing images.

This specification describes systems and methods for using sensors (e.g., cameras, infra-red sensors, and so on) included in unmanned aerial vehicles (UAVs) to generate complex geo-rectified imagery, digital surface models, 3D point clouds, 3D mesh, and so on, using sensor information obtained during flight operations of UAVs. To ensure that sensor information which is obtained meets quality score thresholds, the UAV, or a user device in communication with the UAV, can analyze the sensor information and/or infer (e.g., using attitude information, movement information, velocity information, acceleration information, ambient light information, moisture information, and/or other information of the UAV and/or its environment), that the sensor information is acceptable or likely to be acceptable. While this specification largely discusses cameras, any sensor or module that captures real-world information can be included in place of, or in addition to, a camera.

As an example, the UAV can capture an image using an included, or connected, camera (e.g., a visible light spectrum camera), and can analyze the captured image to determine measurements associated with quality scores (e.g., blur, determining whether the image was focused, determining that the image includes sufficient detail, and so on). Additionally, the UAV can determine that as the image was being captured, the UAV, or a gimbal that controls the camera, moved in a manner that indicates the resulting image is, or is likely to be, blurry, out of focus, and so on. For instance, the UAV can determine (e.g., using included accelerometers, rotational rate gyros, anemometers, altitude sensors, and/or other sensors) that a gust of wind moved the UAV as the image was being captured, and that given a shutter speed of the camera, a determined distance the UAV moved, and so on, the resulting captured image fails, or is likely to fail, to meet the quality score thresholds.

As will be described (e.g., with respect to FIG. 1), the UAV can capture images at least partly in response to one or more triggers being satisfied. In this specification, satisfaction of a trigger can be determined from a present location of the UAV, an upcoming location of the UAV, a present time, or one or more circumstances being satisfied, and so on. For instance, the UAV can determine, from information describing a flight plan, that at a particular set of location coordinates (e.g., longitude, latitude, and/or altitude) the UAV is to capture an image, or that between two location coordinates the UAV is to capture images periodically (e.g., periodically in time, such as every 30 seconds, or in terms of distance traveled, such as every 100 linear feet). Additionally, the UAV can receive (e.g., from a user device in communication with the UAV,) an instruction indicating that the UAV is to capture an image (e.g., a manual trigger that a user of the user device requests). By way of example, the user device may be a mobile, touch screen computing device (e.g., a touch screen tablet, laptop, or smart phone), a stationary desktop computer, a non-touch screen laptop, a dumb terminal coupled to a server, or the like. In another instance, the UAV can determine, or receive, information triggering the re-capture of an image with at least one quality score that is less than a particular threshold.

The UAV stores each captured image, along with metadata information describing the capture of the image, optionally including timestamps of when the UAV was triggered to capture the image, timestamps of when the camera actually took the image, such as a timestamp included in the image as EXIF data by the camera or a timestamp of when the UAV receives information from the camera indicating a successful image capture (e.g., the camera can struggle obtaining focus and take an image after it was triggered), and optionally other information including, for example, some or all of the following: location information of the UAV (e.g., global positioning system (GPS) coordinates), attitude information of the UAV, velocity information of the UAV, acceleration information of the UAV, ambient light information, moisture information, and so on. The captured images and associated metadata can be utilized by an outside system (e.g., server system, laptop, computer system, tablet) to generate geo-rectified imagery, digital surface models, and so on. Since in some UAVs, an included camera might be decoupled from other modules (e.g., a GPS module), the outside system can access log data indicating times at which an image was captured, and log data indicating times at which GPS coordinates were taken, and correlate the logs to determine a location at which the UAV captured an image. Correlating log data is described below, with reference to FIG. 8.

The UAV can optionally provide information to a user device of a user (e.g., an operator), as described above, indicating capture of each image. For instance, the UAV can capture an image associated with satisfaction of a trigger, and can provide information (e.g., a message) indicating the capture event to the user device along with metadata associated with the capture (e.g., timestamp, location information, and/or other information discussed herein). Utilizing information describing a field of view of the camera, the user device can highlight presented imagery of an area being flown over by the UAV that is visualized in the image. In this way, a user of the user device can monitor progress of the UAV as it progresses through a flight plan capturing imagery.

In addition, optionally the UAV can provide a representation of the captured image along with the information indicating the capture to the user device. For instance, the UAV can generate a reduced quality version (e.g., a reduced resolution, reduced color information, and so on) of the captured image to be transmitted (e.g., wirelessly transmitted using Wi-Fi, Bluetooth, cellular network such as 3G, 4G, LTE) to the user device to increase the speed of transmission, reduce wireless network bandwidth use, reduce memory storage needed to store the image on the user device, and/or reduce user device processing bandwidth needed to process the image. The user device can then present the reduced quality version of the captured image to the user, providing the user with live imagery as the UAV progresses through the flight plan.

Furthermore, the UAV can provide the reduced quality version upon determining that the captured image does not meet quality score thresholds, and the user device can perform complex analyses on the reduced quality version to determine whether the image needs to be re-taken (e.g., by performing a fast-Fourier transform on the image or portions of the image, examining the frequency components, and based on the number of high frequency components, determine whether the image is blurry, by using a Hough transform, wavelet transform, etc.). Alternatively, or on conjunction, the user of the user device can visually determine whether the reduced quality version is acceptable, and can indicate to the UAV whether to re-take the image. Additionally, the user device can request the full quality version of the captured image to determine whether the captured image meets quality score thresholds. In this way, the user device and UAV can operate in concert to ensure that all captured images meet quality thresholds.

In this specification, UAVs include any unmanned aerial vehicles, such as drones, unpiloted aerial vehicles, remotely piloted aircraft, unmanned aircraft systems, any aircraft covered under Circular 328 AN/190 classified by the International Civil Aviation Organization, and so on. For example, various types of UAVs may be used to implement the inventions described herein (for example, a fixed wing airplane, helicopter, a multi-rotor vehicle (eg., a quad-copter in single propeller and coaxial configurations), a vertical take off and landing vehicle, lighter than air aircraft). A multi-rotor vehicle in a coaxial configuration may use the same propeller pitch and diameter propellers, use different pitch and diameter propellers, or variable pitch propellers. In addition, certain aspects of the disclosure can be utilized with other types of unmanned vehicles (e.g., wheeled, tracked, and/or water vehicles). Sensors, which are included in the general term payload modules (e.g., any hardware, software, module, and so on, that is not critical to the flight operation of the UAV), can include any device that captures real-world information, including cameras, radiation measuring instruments, distance detectors such as Lidar, and so on.

FIG. 1 illustrates an example block diagram 10 of systems associated with capturing images. The block diagram 10 includes a hardware module 12, included in an unmanned aerial vehicle (UAV), that can receive triggered information indicating that an image is to be captured, and can provide information (e.g., a data message, a pulse such as a pulse width modulated signal) to a camera 14, included in the UAV, to capture the image. After the camera 14 captures the image, information indicating the capture can be provided from the camera to the hardware module 12. The hardware module 12 can direct that the information be stored (e.g., in one or more data logs), along with metadata describing timestamp information, and optionally location, attitude, and so on, information of the UAV, and/or be transmitted to a user device presenting a user interface 18 for presentation to a user. The user interface 18, which is further illustrated in FIG. 3, can present information describing a flight plan the UAV is implementing. For instance, the user interface 18 can present imagery (e.g., satellite imagery) of a geographic area associated with the flight plan, including a present location of the UAV, and a flight path the UAV is to follow.

As illustrated in FIG. 1, an autopilot system 16 (e.g., a hardware module comprising one or more processors and/or one or more ASICS, FPGAs, and so on, that commands, controls the UAV, and interfaces with the user device presenting the user interface 18) provides the triggered information to the hardware module 12. Optionally, the autopilot system 16 can include the hardware module 12 (e.g., the hardware module 12 can be implemented as software executing on the autopilot system 16), and can provide information to the camera 14 to capture images.

The camera 14 can be configured (e.g., prior to the UAV flying, or during flight) by a user utilizing a configuration utility 20, that can generate user interfaces (e.g., web pages to be rendered by a user device) which enable the user to properly configure the camera 14. For instance, the configuration utility 20 can include selectable options to describe how the hardware module 12, or autopilot system 16, is to interface with the camera 12. As an example, the user can utilize the configuration utility 20 to designate that a particular port of the hardware module 12, or autopilot system 16, is to provide information to the camera 14, and further designate a type of information that the camera 14 (e.g., based on information describing a particular model of the camera 14) utilizes (e.g., a pulse, data message, and so on) as an instruction to capture imagery. An example of a user interface configuring a UAV to interact with a camera 14 is illustrated in FIG. 2.

As described above, images can be captured in response to different triggers being satisfied. For instance, a user of the user interface 18 (e.g., a user monitoring the progress of the UAV), can interact with the user interface 18 to instruct the UAV to capture an image. The autopilot system 16 can then receive the instruction (e.g., over a wireless connection), and provide information to the hardware module 12 to capture an image. Additionally, the user interface 18 can determine (e.g., without user interaction), locations, times, and so on, indicated in a flight plan the UAV is following, that trigger images being captured. That is, the user interface 18 can present the UAV's progress of performing a flight plan, and at appropriate times, locations, can provide instructions to the autopilot system 16 to capture imagery.

Additionally, the autopilot system 16, or another hardware module in communication with the autopilot system 16, can determine locations and/or times at which to trigger the capturing of an image. For instance, the autopilot system 16 can maintain information describing the flight plan for the UAV to follow, including one or more waypoints (e.g., GPS coordinates) at which to perform actions (e.g., capture images, capture sensor information), and actions to take while traveling between waypoints (e.g., maintain a particular speed of travel, travel at a particular altitude, capture images periodically, and so on). The autopilot system 16 can therefore determine (e.g., based on information describing a current location of the UAV, such as GPS coordinates, UAV altitude, a speed of the UAV, attitude information of the UAV, wind conditions, and so on) that imagery is to be captured. In this way, the UAV can determine when, and/or where, to trigger the camera 14 to capture an image. The locations at which to trigger the camera can also include local coordinates, which can be useful when GPS is not available or reliable. The local coordinates can be indicated, or defined, with respect to a user defined location or a landmark. The UAV's local pose (position and orientation) can be determined via a visual-inertial system, for example, fusing measurements from a camera and IMU.

As the UAV progresses through the flight plan, optionally the user interface 18 can receive information describing each captured image (e.g., timestamp, location information of the UAV, information sufficient to determine a field of view of the image such as attitude information, gimbal information, and so on), and can present a footprint of a geographic area that was visualized in the captured image. That is, the user interface 18 can present a shaded polygon illustrating what area of the presented imagery has been captured during the flight plan.

As will be described, the autopilot system 16, or another hardware module in communication with the autopilot system 16, can analyze each captured image (or selected captured images) and determine whether it meets one or more quality score thresholds. Upon determining that a captured image is below acceptable quality, the autopilot system 16 can provide information to the hardware module 12 to re-capture the image. The autopilot system 16 can automatically maneuver the UAV back to a location at which the unacceptable image was captured, or the autopilot system 16 can determine that a present location of the UAV will include an acceptable field of view of the desired area to be photographed—and instruct the hardware module 12 to re-capture the image.

Additionally, the autopilot system 16 can provide a reduced quality version (e.g., reduced resolution) of a captured image to a user device presenting the user interface 18 (e.g., for presentation instead of merely presenting the footprint as described above). A user of the user interface 18, or a user device presenting the user interface 18, can determine that the captured image is to be retaken, and the user device can provide information to the autopilot system 16 to re-capture the image. Optionally, the autopilot system 16 can perform an initial quality analysis, as described above, and upon determining that the captured image is unacceptable, can provide information to the user device presenting the user interface 18 to perform an analysis of the captured image. Optionally, the user device presenting the user interface 18 can request, from the autopilot system 16, a full quality version (e.g., as captured and/or output by the camera 14 (e.g., a RAW version of the image output by the camera 14 or a JPEG version of the image output by the camera 14) to perform an analysis on.

FIG. 2 illustrates an example user interface 200 for configuring a UAV to interface with a camera to be included in the UAV. The user interface 200 is an example of an interactive user interface provided for presentation on a user device (e.g., a web page rendered by the user device). The user interface 200 can receive user interactions from a user of the user device, and perform actions associated with the user interactions. For instance, the user device presenting the user interface 200 can provide configuration information to a UAV for storage (e.g., over a wired or wireless connection).

In the example, a user has indicated that a particular connector (e.g., "Port 4") of a module (e.g., an "Actuator Control Module" 204, such as the hardware module 12 described above), is to be associated with a camera. The user can select from one or more selectable options 206 depending on a type of camera selected for inclusion in the UAV. For instance, the user can select either a pulse width modulation type signal to be provided to the camera, or a pulse to be provided to the camera, with either option triggering the camera to capture an image. Additionally, the user can indicate that the pulse width modulation type signal is to control particular aspects of the camera, such as a brightness of a flash, while the pulse is to indicate that an image is to be captured.

Figure 3:
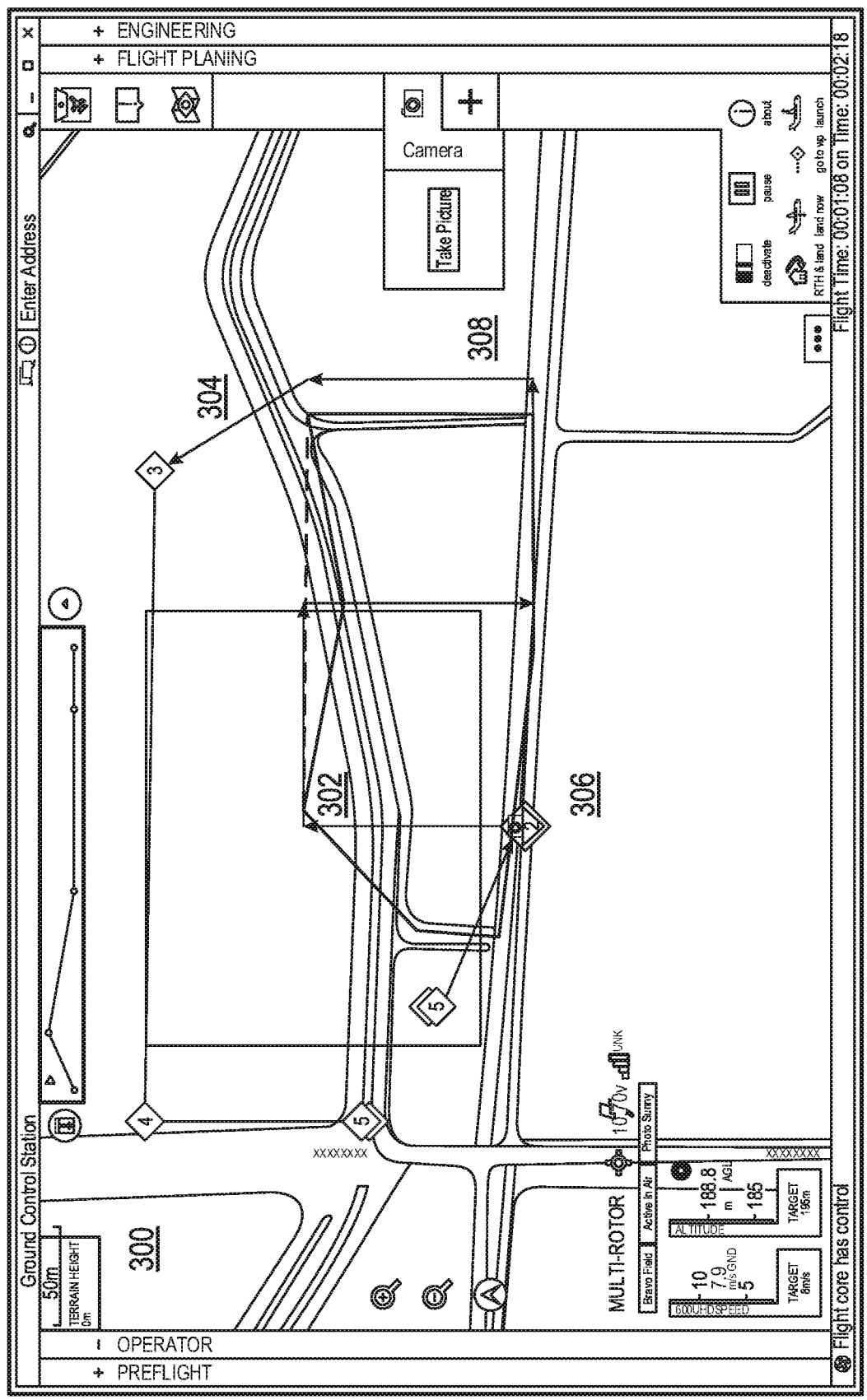
FIG. 3 illustrates an example user interface presented on a user device of a user, such as an operator associated with a flight plan of a UAV.

FIG. 3 illustrates an example user interface 300 presented on a user device of a user, such as an operator associated with a flight plan of a UAV. In this specification, an operator is a person that monitors progress of a flight plan, and who can provide information, or optionally command and control instructions, to a UAV performing the flight plan. Optionally, the operator can be positioned within a threshold distance of the UAV (e.g., the operator can maintain line-of-sight with the UAV).

For instance, a flight plan associated with inspecting rooftop damage (e.g., weather damage) can include an operator and a UAV performing steps in a concerted effort to determine rooftop damage. For example, a flight plan can be generated and provided to the UAV and to a user device of the operator (e.g., via a wireless connection), with the flight plan indicating a property to be inspected. The UAV can travel at a particular altitude above the rooftop capturing images of the rooftop, and provide the captured images to the user device of the operator. The operator can review the images, and indicate, on the user device, locations that appear to be damaged (e.g., determined by the operator to be damaged). For example, the user can use a stylus, finger, and/or cursor controls to marks portions of the image that include damaged portions of the rooftop. Each such indicated location can be set as a waypoint for the UAV to travel to, and at the waypoint the UAV can be instructed to descend towards the rooftop and to capture detailed images. In this way, the operator can provide information to the UAV relevant to a successful completion of the flight plan.

In other instances, the operator can take less of an active role, and monitor progress of a flight plan utilizing the presented user interface 300. As illustrated in the user interface 300, a UAV 302 is traveling along a flight path 304 that includes multiple waypoints for the UAV to travel to (e.g., waypoint 306). The operator can interact with selectable options to provide instructions to the UAV, including a selectable option 308 indicating that the UAV is to capture an image.

Upon interaction of the selectable option 308, information can be provided, from the user device presenting the user interface 300 to the UAV 302, triggering the UAV 302 to capture an image.

Additionally, as illustrated in the example user interface 300, waypoint 306 is adjacent to an icon of a camera. The operator can interact with the selectable option 308 to associated actions with particular waypoints, including as illustrated, an action to capture an image. Therefore, when the UAV 302 travels to waypoint 306, the user device presenting the user interface 300 can provide information to the UAV triggering the capture of an image.

Similarly, optionally the camera icon adjacent to the waypoint 306 can automatically be included based on the flight plan (e.g., the operator, or a different user can generate a flight plan that includes an action to capture an image at waypoint 306). Therefore, when the UAV 302 travels to waypoint 306, the user device can provide information to the UAV 302 triggering the capture of an image. Alternatively, the UAV 302 can determine (e.g., from stored information describing the flight plan) that when the UAV 302 is at the location coordinates associated with the waypoint 306 (e.g., the UAV 302 can compare its present location to the location coordinates), the UAV 302 is to capture imagery.

As described above, after an image is captured by the UAV 302, the UAV can provide information to the user device indicating that an image was captured. Optionally, the user interface 300 can update to include a geographic area that was captured (e.g., visualized) in the image. The user device can utilize information describing a field of view of the UAV's camera, and a location of the UAV when the image was captured to determine the captured geographic area. For instance, the user interface 300 can highlight, shade, or otherwise identify the associated geographic area. Additionally, the user interface 300 can update to briefly flash (e.g., increase brightness, temporarily increase contrast, and so on) the geographic area to alert the user of the user interface 300 that an image was captured.

Furthermore, optionally the user device presenting the user interface 300 can receive a version of the captured image (e.g., a reduced quality version), and can present the received version in the user interface 300 (e.g., replacing or overlaying the satellite imagery with the captured image, or upon interaction with a selectable object). As described elsewhere herein, the UAV, the user device, or the user of the user interface 300, can determine that the captured image is unacceptable (e.g., based on associated quality scores), and the UAV can re-capture the image.

Figure 4:
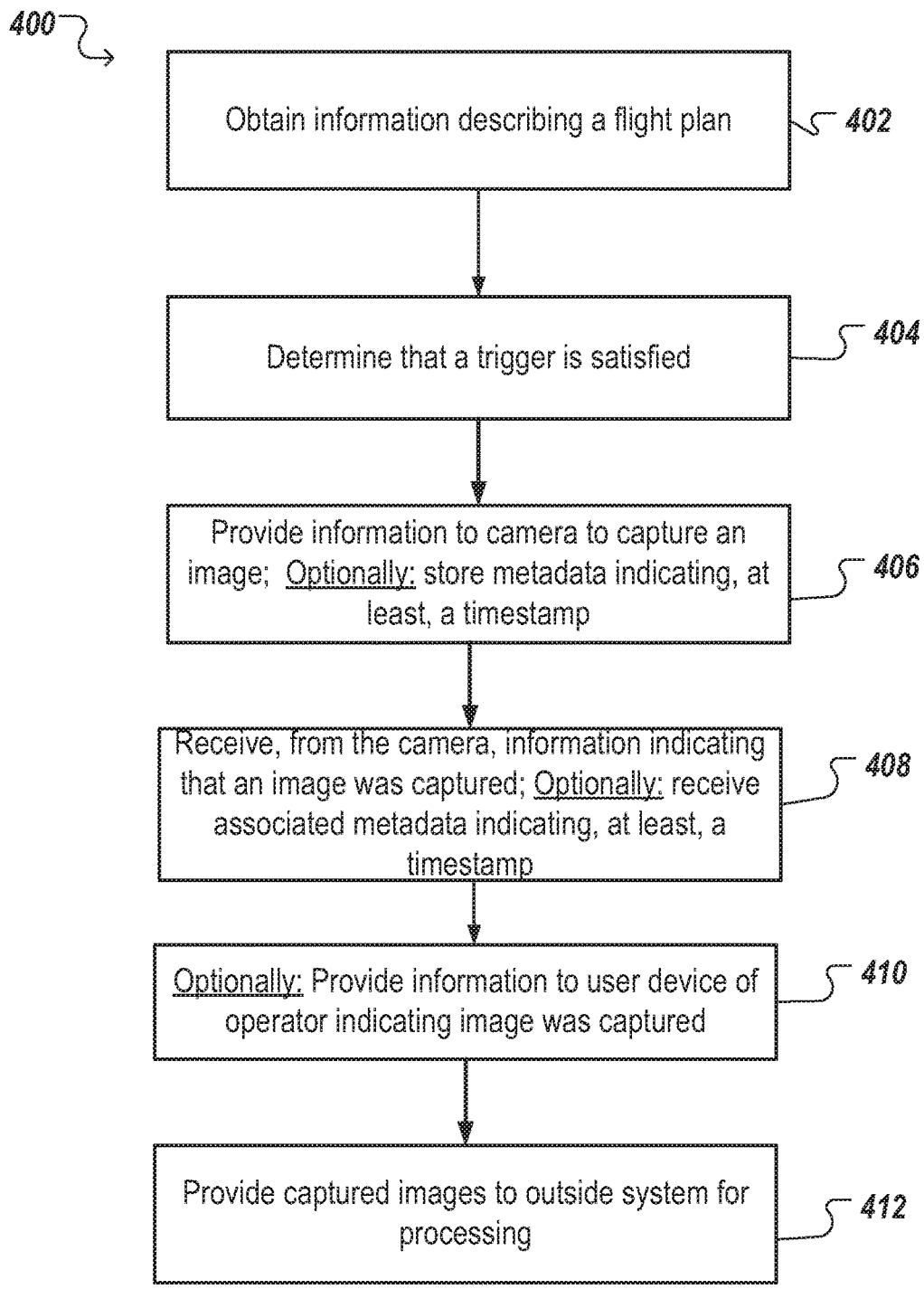
FIG. 4 is a flowchart of an example process to generate processed information from images captured by a UAV

FIG. 4 is a flowchart of an example process 400 to generate processed information from images captured by an unmanned aerial vehicle (UAV). For convenience, the process 400 will be described as being performed by a system of one or more processors (e.g., an Unmanned Aerial Vehicle (UAV) implementing the UAV processing system 700).

The UAV obtains information describing a flight plan to implement (block 402). A user can provide information to a system (e.g., a server system, a user device), describing a flight plan. For instance, a flight plan can include one or more geofence boundaries for a UAV to enforce (e.g., a virtual perimeter, or volume of space, for a real-world geographic area, or volume, that limits allowable location of the UAV to locations within the geographic area, or volume), location information identifying one or more safe take-off and landing locations, flight pattern information (e.g., one or more waypoints for the UAV to travel to during the flight plan), particular survey or flight mission information (e.g., damage inspection of structures), and so on. The flight plan can be generated by the system to indicate the included information and actions for the UAV to take to effect the survey or flight mission information, such as capturing images, or other sensor data, at each waypoint, and periodically between waypoints.

The system can also determine, or receive, information identifying a ground sampling distance (GSD) indicating a minimum number of pixels (e.g., image pixels) per distance (e.g., 1 meter) that are acceptable for captured images. The GSD can therefore indicate a particular altitude for a particular camera, above which the particular camera will not capture acceptable images (e.g., the images will not include sufficient image pixels per distance). For instance, the system, or UAV, can determine the particular altitude based on capabilities of an included camera (e.g., sensor size, sensor resolution, aperture, shutter speeds, the camera sensor type (e.g. CMOS, CCD), frame rate, zoom capability, focal length, lens type, focusing range, focusing area, focusing type, file format, and so on).

As will be described, the GSD can be utilized by the UAV to ensure that images are appropriately detailed. That is, if the UAV captures an image above the particular altitude indicated by the GSD, the image can be determined to below a quality score threshold, and the image can be re-taken. Optionally, the UAV can utilize Lidar, or other sensors, to determine an actual altitude above an object being imaged, and can use the actual altitude instead of the UAVs altitude above sea level (e.g., determined from a barometric sensor).

The UAV obtains (e.g., over a wired or wireless connection) from the system, or from a user device of an operator that receives the flight plan, information describing the flight plan. Additionally, as illustrated in FIG. 2, the UAV receives configuration information including information associated with the valid configuration of interfacing with an included camera. The UAV can then begin the flight plan, including ascending to a particular altitude from a take-off location, and traveling to an initial waypoint.

The UAV determines that a trigger is satisfied during the flight plan (block 404). As described above, satisfaction of a trigger can be determined from a present location of the UAV, an upcoming location of the UAV, a present time, one or more circumstances being satisfied, and so on.

For instance, as described above with reference to FIG. 3, the UAV can receive information from a user device (e.g., user device of an operator) to capture an image. The instruction can be received in response to a user (e.g., an operator) of the user device requesting (e.g., in a presented user interface) that the UAV capture an image. The instruction can also be received in response to the user device automatically providing requests to the UAV, for instance periodically (e.g., after a repeating period of time, after a repeating distance traveled by the UAV), or based on a flight plan the UAV is implementing. For example, the user device can store information describing the flight plan, and can provide requests to the UAV according to the flight plan (e.g., the UAV is traveling between waypoints and the flight plan indicates that images are to be requested periodically, the UAV is at a waypoint and the flight plan indicates that images are to be requested as the UAV descends closer to indicated damage, and so on). The UAV can determine that such an instruction satisfies a trigger to capture an image.

Additionally, the UAV can determine that a present location of the UAV satisfies a trigger to capture an image. For instance, the flight plan can indicate that at a particular waypoint (e.g., a particular longitude and latitude), the UAV is to capture one or more images. Additionally, the flight plan can indicate that as the UAV is traveling along a flight path, the UAV is to periodically capture imagery. The UAV can utilize configuration information describing the included camera, to determine a measure of the periodicity. For instance, the UAV can determine that an included camera with a longer focal length (e.g., 85 mm) will need to capture more images than a camera with a shorter focal length (35 mm). Therefore, the UAV can utilize flight plan information to determine locations at which the UAV is to capture imagery. Similarly, the flight plan can indicate speeds for the UAV to travel (e.g., speeds between waypoints), and the UAV can determine times at which the UAV is to capture imagery (e.g., the UAV can determine that if it travels at a constant velocity it is to capture imagery after a repeating period of time.)

The UAV can further determine that as it travels along a flight path, it has captured sufficient imagery to effect a goal of the flight plan. For instance, a flight plan can be associated with performing an inspection (e.g., a damage inspection) of a vertical structure (e.g., a cellular tower, a bridge). The UAV can travel to one or more waypoints, and descend/ascend at the waypoints while capturing imagery. The UAV can determine, by analyzing captured images, that the images encompass the entirety of the vertical structure. The UAV can utilize computer vision techniques (e.g., visual classifiers) to determine that the vertical structure is captured. If the UAV determines that the structure has not been captured, the UAV can capture additional imagery.

The UAV can determine that a trigger is satisfied upon determining, or receiving instructions from a user device, to re-capture an image. For instance, UAV can capture an image, and after analyzing the image, determine that the image is unacceptable (e.g., associated quality scores below one or more thresholds). The UAV can then re-capture the image, which can include traveling to a same, or similar location, as the unacceptable image, or rotating about a particular axis (e.g., turn left or right), to re-capture the same image from a different perspective. Re-capturing an image is further described below, with respect to FIGS. 5-6.

The UAV provides information to the camera to capture an image, and optionally stores metadata indicating, at least, a timestamp (block 406). Optionally, other metadata may be stored, such as some or all of the following sensor information captured at about the time the image is captured by the camera: acceleration information from an accelerometer, velocity information, attitude information from a rotational rate gyro, wind information from an anemometer, altitude information from an altitude sensor, location information from a GPS sensor, information describing a camera gimbal position, and/or other information. As graphically illustrated in FIG. 1, the UAV provides information to an included camera indicating that the camera is to capture an image. For instance, the UAV can provide a pulse (e.g., a pulse of a particular voltage, duration, frequency, and so on) which the camera can interpret as information to capture an image. Additionally, the UAV can provide data (e.g., a message) to the camera to capture an image (e.g., the UAV can utilize one or more message protocols utilized by the camera). The UAV stores a timestamp associated with providing information to the camera. The timestamp can be stored in one or more logs associated with the flight plan, such as a flight log, a payload module log, a camera log, and so on.

As similarly, noted above, optionally, the UAV can store various items of information, such as some or all of the following: a present location (e.g., GPS coordinates) of the UAV, attitude information (e.g., determined from an inertial measurement unit), velocity information, acceleration information, altitude information, wind information, information describing a gimbal that controls orientation of the camera, and so on. That is, the UAV can request location information at the same, or similar time, as providing a request to the camera to capture an image.

Alternatively and as described above, in some UAVs, syncing the storing of a timestamp of a camera being activated with location information can be difficult. These UAVs can periodically store location information, and an outside system can correlate the periodically obtained location information with the camera timestamp information to determine an estimated location at which each image was likely captured, which is further described below with reference to FIG. 8

The UAV receives, from the camera, information indicating that an image was captured, and optionally receives metadata indicating, at least, a timestamp (block 408). The UAV receives information from the camera, such as a similar pulse or data, indicating that an image was captured (e.g., an "image taken" timestamp as further described in FIG. 8). For instance, the camera can provide information upon detecting that its shutter opened or closed. In another instance, the camera can provide information upon detecting that an image was actually captured (e.g., a mirrorless camera that uses an electronic shutter curtain). The timestamp can be stored in one or more logs associated with the flight plan, such as a flight log, a payload module log, a camera log, and so on.

While the timestamp obtained in block 406 will generally be within a threshold time of the present timestamp, in certain scenarios the timestamp can be different. For instance, the camera can struggle with obtaining a focus lock (e.g., in night or if the sun is shining directly at the camera), and the timestamp can be outside of the threshold time from the timestamp in block 406. Therefore the timestamp obtained in block 408 can be preferred when the difference in time from the timestamp in block 406 is greater than a threshold.

Optionally, after providing the camera information to capture an image, the UAV can temporarily increase a frequency at which it determines its present location. If the camera struggles with obtaining a focus lock, and the image is taken greater than a threshold time from the timestamp in block 406, the timestamp in block 408 can be preferred. Since the UAV is determining its present location more frequently, an outside system can more accurately determine a location the UAV was at when the actual image was taken. For instance, a UAV traveling between waypoints can provide information to the camera to capture an image and also capture location information of the UAV. If the camera actually captures the image 400 ms later, the location information can be incorrect depending on a speed of the UAV. Thus, if the UAV increases a frequency at which it determines its location, a more accurate location can be determined that corresponds to a location of the UAV 400 ms later. When combining the captured images, an outside system can generate a better geo-rectified, or ortho-rectified, stitched image if it has access to more accurate timestamps and location information.

The UAV optionally provides information to a user device of a user (e.g., an operator) indicating that an image was captured (block 410). As illustrated in FIG. 1, the UAV can provide information (e.g., a data message) over a wireless connection with the user device indicating that the image was captured. The user device can utilize the received message to inform the user of the capture, as described above in FIG. 3.

Optionally, the UAV can wait to provide the information until the UAV has been determined to be of acceptable quality (e.g., as described below in FIG. 5). Additionally, as will be described below, optionally the UAV can generate a reduced quality version of the captured image, and provide the reduced quality version to the user device for analysis and/or presentation to the user.

The UAV provides captured images to an outside system for processing (block 412). After completion of the flight plan, or optionally during the flight plan, the UAV provides to an outside system (e.g., over a wired or wireless connection) the captured imagery and associated metadata. The outside system can utilize the received imagery to stitch (e.g., combine) the imagery together. The stitching can involve mapping the images to a real-world coordinate frame, utilizing associated timestamps and location information of each image. In this way, the images can be used to generate a geo-rectified or ortho-rectified image of a geographic area imaged by the UAV.

As an example, the outside system can obtain an image and associated timestamp information. The outside system can then access logs describing GPS coordinates of the UAV and associated timestamps. The outside system can determine a location of the UAV by correlating the GPS timestamps, for instance the outside system can determine that the timestamp associated with the image is between two GPS timestamps, and determine a likely GPS coordinate that would correspond to the image timestamp. Additionally, the outside system can generate a 3D model of a structure imaged by the UAV, such as a house, a cellular tower, and so on. Additional description is included below, with respect to "Additional Features."

Figure 5:
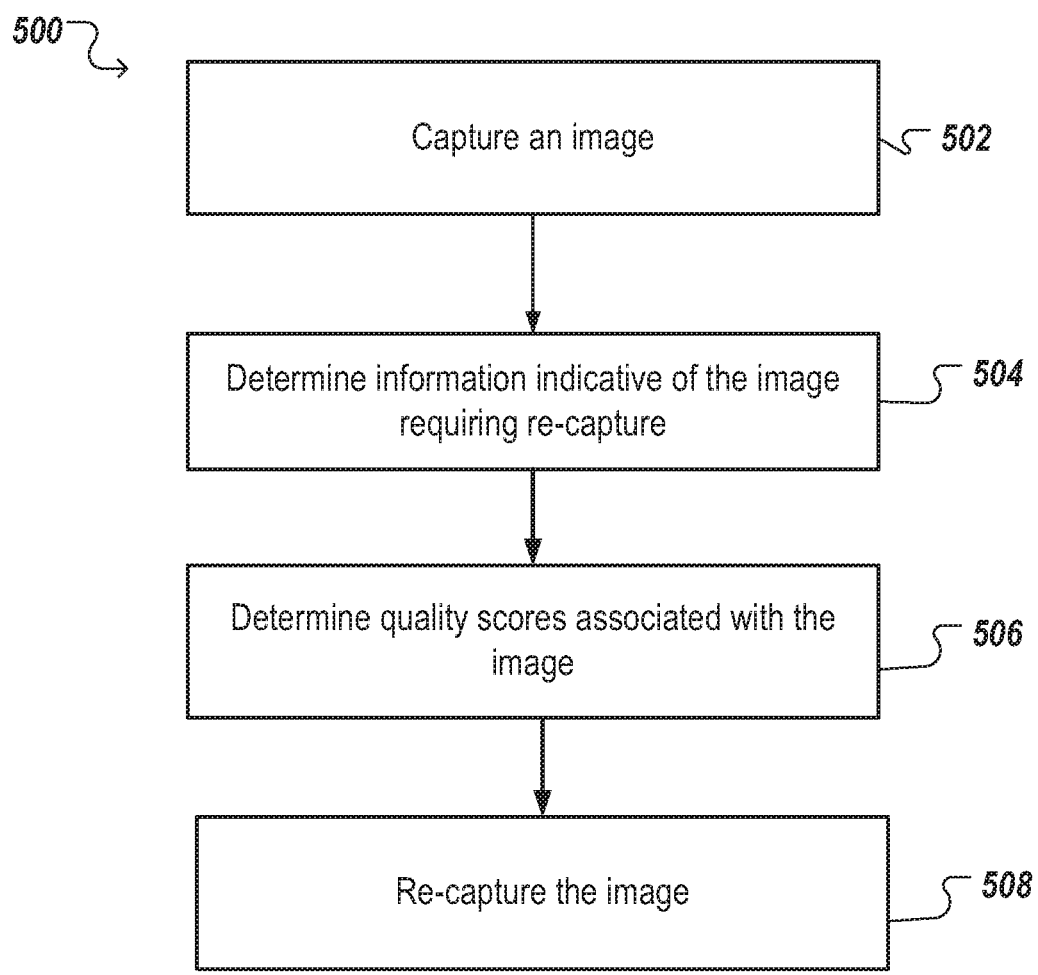
FIG. 5 is a flowchart of an example process of a first example technique of a UAV determining to re-capture an image.

FIG. 5 is a flowchart of an example process 500 of a first example technique of a UAV determining to re-capture an image. For convenience, the process 500 will be described as being performed by a system of one or more processors (e.g., an Unmanned Aerial Vehicle (UAV) implementing the UAV processing system 700).

The UAV captures an image (block 502). As described above, with reference to FIG. 4, the UAV can capture an image (e.g., upon determining that one or more triggers are satisfied). The UAV stores the image in volatile, or non-volatile, storage for processing.

The UAV determines information indicative of the image requiring re-capture (block 504), or that re-capture of the image is otherwise desirable. The UAV determines information that can be indicative of the image being out of focus, being blurry, not including an intended field of view, and so on.

For instance, the UAV's may detect sudden shifts or movement of the UAV, for example due to a sudden gust of wind, or in response to detecting a contingency condition (e.g., another UAV enters a same geofence or airspace). The UAV may detect output of included accelerometers and/or included rotational rate gyros. If a threshold magnitude level is detected when an image is taken, the UAV can determine to re-capture the image.

Furthermore, the UAV can compare a speed that the UAV is traveling with a shutter speed of the camera (e.g., obtained from exchangeable image file format (EXIF) information included in the captured image). The UAV can determine that given the speed, and the shutter speed of the camera, that the image is likely blurry or out of focus. For instance, during a time of day without a lot of light, the UAV might have to modify the flight plan (e.g., transition speed between waypoints) to obtain clear images.

Additionally, the UAV can determine an altitude at which the image was captured. The UAV can then compare the determined altitude to the ground sampling distance (GSD), as described above in FIG. 4, to determine whether the image includes an acceptable number of pixels per distance. Additionally, the UAV can utilize distance sensors, such as Lidar, to determine a distance of the UAV (e.g., a vertical distance and/or horizontal distance) from an object being imaged.

The UAV can therefore determine information that indicates the image needs to be re-captured. Additionally, even if the UAV determines such information, the UAV can still analyze the image to determine quality scores, as described in block 506.

The UAV determines one or more quality scores associated with the image (block 506). The UAV can, after capturing an image, move into a holding position, and then analyze the image. If the UAV determines that the image does not meet quality score thresholds, the UAV can determine to re-capture the image.

The UAV determines quality scores indicating respective measures of quality. For instance, a quality score can be associated with sharpness measurements of the image. A frequency domain analysis of the image can be performed, and a lack of high frequencies can be indicative of a lack of focus (e.g., compared to an expected inclusion of high frequencies for the image). Additionally, a laplacian kernel can be convolved with the image (e.g., in the spatial domain) and the result can be used to determine a measure of blurriness of the image (e.g., intensity values of pixels within a threshold distance can be compared, and a blurry image can have a lack of comparisons greater than a threshold). Additional quality scores can include a measure of sufficient overlap with one or more adjacent (e.g., images capturing adjacent real-world geographic areas), or prior taken, images, brightness measurements, exposure measurements, contrast measurements, and so on.

The UAV re-captures the image (block 508). The UAV provides information to the camera to recapture the image, if the UAV is at a same, or similar, location as when the image was captured. If the UAV is at a different location, the UAV can travel back to the prior location and re-capture the image, or the UAV can rotate (e.g., rotate down) to re-capture the image (e.g., the re-captured image can include the same real-world information from a different perspective).

Figure 6:
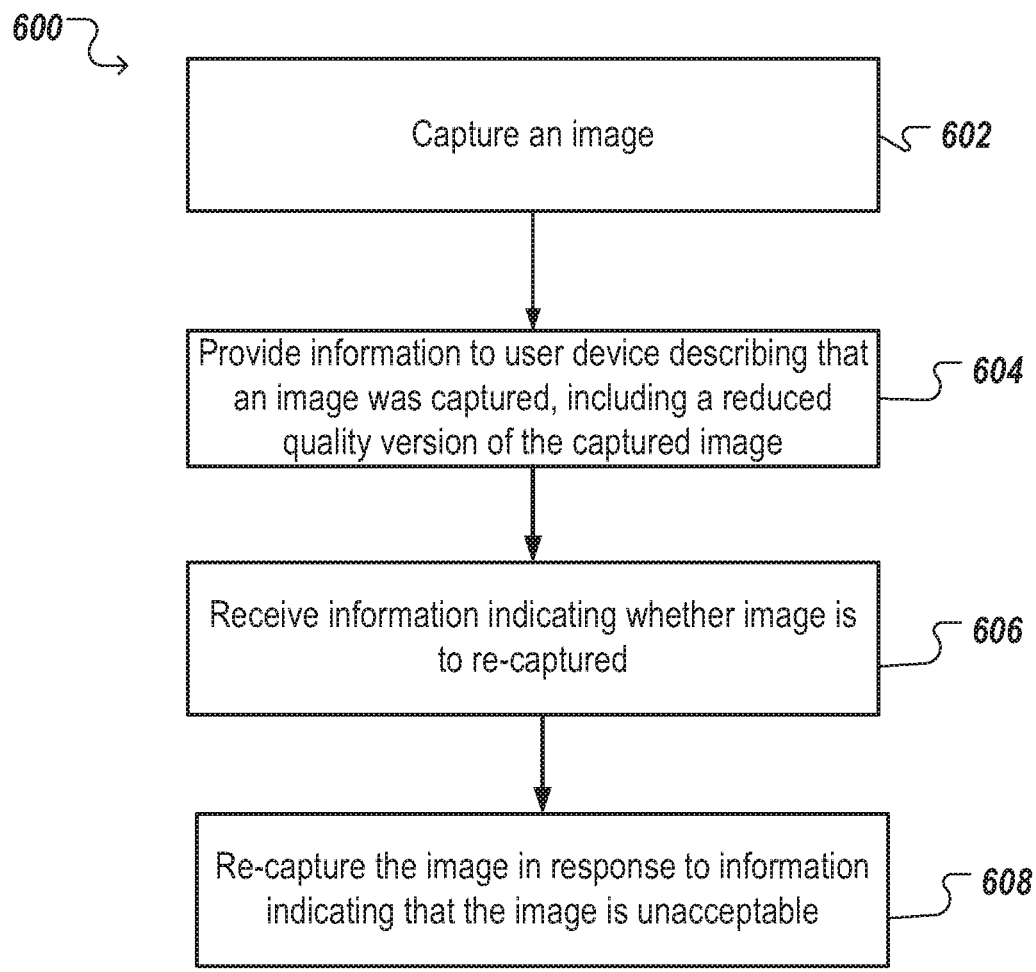
FIG. 6 is a flowchart of an example process of a second example technique of a UAV determining to re-capture an image.

FIG. 6 is a flowchart of an example process 600 of a second example technique of a UAV determining to re-capture an image. For convenience, the process 600 will be described as being performed by a system of one or more processors (e.g., an Unmanned Aerial Vehicle (UAV) implementing the UAV processing system 700).

The UAV captures an image (block 602). As described above, the UAV captures an image upon determining that one or more triggers are satisfied.

The UAV provides information to a user device of a user (e.g., an operator) describing that an image was captured (block 604). As described in FIG. 4, the UAV can optionally provide information (e.g., a data message) over a wireless connection to the user device indicating that an image was captured. The UAV generates a reduced quality version of the captured image, such as a reduced resolution, reduced color channel, reduced contrast, and so on, version of the image to obtain a lower in size (e.g., memory size) version of the captured image. The UAV provides the reduced quality version for presentation on the user device, so that the user of the user device (e.g., the operator) can view live-images as the images are being captured.

The UAV receives information indicating whether the image is to be re-recaptured (block 606). The user device of the user (e.g., operator) can analyze the received reduced quality version of the captured image to determine whether the image is to be re-taken. For instance, the user device can utilize its enhanced processing and battery power (e.g., in comparison to the UAV which has limited battery and processing power to devote to image processing) to determine quality scores (e.g., as described in FIG. 5). Additionally, the UAV can analyze information indicative of the image requiring re-capture (e.g., as described above in FIG. 5). As an example, optionally the user device can obtain (e.g., from stored information), or receive (e.g., from the UAV), capabilities of the camera included in the UAV, and can utilize the capabilities to determine whether a height associated with the image is greater than the ground sampling distance. (e.g., as described above). Upon a positive determination that the image does not meet associated quality score thresholds, or information indicates the image is to be re-captured, the UAV can receive information indicating that the image is to be re-captured.

Additionally, the user of the user device can indicate on the presented user interface (e.g., user interface 300), whether the image is of acceptable quality. For instance, the user can interact with the user device to indicate that the image is problematic (e.g., the user device can present selectable options, the user can swipe left or right on an image, the user can tap or double tap an image, the user can verbally describe the problem, and so on).

Optionally, the user device can request a full version of the captured image, and the UAV can provide the full version. Since the full version may take longer to transmit to the user device, the UAV can hover in place while the user device processes, or the user views, the full captured image.

The UAV re-captures the image in response to receiving re-capture information (block 608). Upon receipt of information indicating that the provided image is to be re-captured, the UAV triggers the camera to capture the image. Additionally, as described above, the UAV can travel, or rotate, to a position, or attitude, at which the UAV can re-capture the image.

Optionally, the UAV can provide the re-captured image to the user device for confirmation that it is acceptable.

If the user device, or user, does not find the image to be unacceptable, the user device can provide information directing approval of the image to the UAV, or alternatively can provide no information and the UAV can determine that the image was approved after a threshold amount of time.

Optionally, the UAV can perform an initial determination of whether a captured image is acceptable (e.g., either, or both, blocks 504 and 506 as described above in FIG. 5). Upon a positive determination that the image is unacceptable, the UAV can provide a reduced quality version of the captured image, or a full quality version, to the user device for additional analysis (e.g., by the user device or by the user of the user device).

Figure 7:
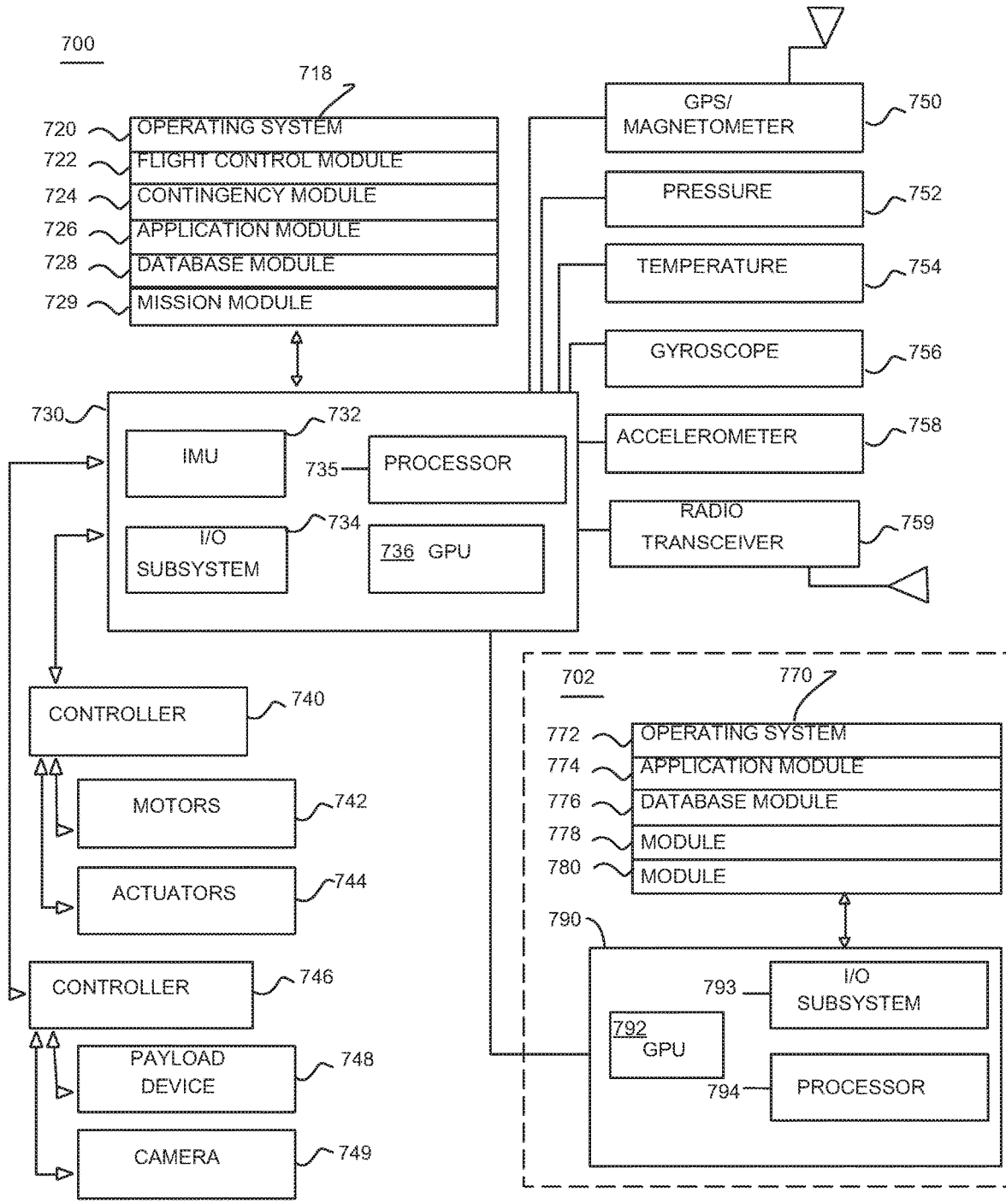
FIG. 7 illustrates a block diagram of an example UAV architecture for implementing the features and processes described herein.

FIG. 7 illustrates a block diagram of an example Unmanned Aerial Vehicle (UAV) architecture for implementing the features and processes described herein. A UAV primary processing system 700 can be a system of one or more computers, or software executing on a system of one or more computers, which is in communication with, or maintains, one or more databases. The UAV primary processing system 700 can be a system of one or more processors 735, graphics processors 736, I/O subsystem 734, logic circuits, analog circuits, associated volatile and/or non-volatile memory, associated input/output data ports, power ports, etc., and/or one or more software processing executing one or more processors or computers. The autopilot system 730 includes the IMU 732, processor 735, I/O subsystem 734, GPU 736, and various operating system 720, and modules 720-729. Memory 718 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GNSS receivers (e.g., a GPS, GLONASS, Galileo, or Beidou system) 750, gyroscopes 756, accelerometers 758, pressure sensors (static or differential) 752, current sensors, voltage sensors, magnetometer, hydrometer, and motor sensors. The UAV may use an inertial measurement unit (IMU) 732 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 700 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module (also referred to as flight control engine) 722 handles flight control operations of the UAV. The module interacts with one or more controllers 740 that control operation of motors 742 and/or actuators 744. For example, the motors may be used for rotation of propellers, and the actuators may be used for flight surface control such as ailerons, rudders, flaps, landing gear, and parachute deployment.

The contingency module 724 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 729 processes the flight plan, waypoints, and other associated information with the flight plan. The mission module 729 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 749, video cameras, infra-red camera, multispectral camera, and Lidar, radio transceiver, sonar, and/or TCAS (traffic collision avoidance system) may be connected to the UAV. Data collected by the devices may be stored on the device collecting the data, the data may be stored on non-volatile memory 718 of the UAV processing system 700, and/or the data may be wirelessly transmitted for storage on a remote cloud system.

The UAV processing system 700 may be coupled to various radios, and transmitters 759 for manual control of the UAV, and for wireless or wired data transmission to and from the UAV primary processing system 700, and optionally the UAV secondary processing system 702. The UAV may use one or more communications subsystems, such as a wireless communication or wired subsystem, to facilitate communication to and from the UAV. Wireless communication subsystems may include radio transceivers, and infra-red, optical ultrasonic, electromagnetic devices. Wired communication systems may include ports such as Ethernet, USB ports, serial ports, or other types of port to establish a wired connection to the UAV with other devices, such as a ground control system, cloud-based system, or other devices, for example a mobile phone, tablet, personal computer, display monitor, other network-enabled devices. The UAV may use a light-weight tethered wire to a ground control station for communication with the UAV. The tethered wire may be removeably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the cloud system.

Modules, programs or instructions for performing flight operations, contingency maneuvers, and other functions may be performed with the operating system. In some implementations, the operating system 720 can be a real time operating system (RTOS), UNIX, LINUX, OS X, WINDOWS, ANDROID or other operating system. Additionally, other software modules and applications may run on the operating system, such as a flight control module 722, contingency module 724, application module 726, and database module 728. Typically flight critical functions will be performed using the UAV processing system 700. Operating system 720 may include instructions for handling basic system services and for performing hardware dependent tasks.

In addition to the UAV primary processing system 700, a secondary processing system 702 may be used to run another operating system to perform other functions. A UAV secondary processing system 702 can be a system of one or more computers, or software executing on a system of one or more computers, which is in communication with, or maintains, one or more databases. The UAV secondary processing system 702 can be a system of one or more processors 794, graphics processors 792, I/O subsystem 794 logic circuits, analog circuits, associated volatile and/or non-volatile memory, associated input/output data ports, power ports, etc., and/or one or more software processing executing one or more processors or computers. Memory 770 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 702 will be non-critical functions in nature, that is if the function fails, the UAV will still be able to safely operate. In some implementations, the operating system 772 can be based on real time operating system (RTOS), UNIX, LINUX, OS X, WINDOWS, ANDROID or other operating system. Additionally, other software modules and applications may run on the operating system 772, such as an application module 774, database module 776. Operating system 702 may include instructions for handling basic system services and for performing hardware dependent tasks.

Also, controllers 746 may be used to interact and operate a payload device 748, and other devices such as photographic camera 749, video camera, infra-red camera, multispectral camera, stereo camera pair, Lidar, radio transceiver, sonar, laser ranger, altimeter, TCAS (traffic collision avoidance system), ADS-B (Automatic dependent surveillance—broadcast) transponder. Optionally, the secondary processing system 702 may have coupled controllers to control payload devices.

Additional Features

As described above, in some UAVs, an included camera might be decoupled from other modules (e.g., a GPS module), which can cause difficulty for an outside system to determine precise locations at which a UAV captured a particular image, and thus generate geo-rectified imagery.

Many cameras that are inexpensive and light enough to be mounted on, or included in, a UAV as a payload device usually do not have an integrated GNSS (e.g., GPS) module. These cameras often do not provide an interface to manually insert metadata into individual image files while taking a picture. These cameras store images on an SD card, with metadata (e.g., timestamp and camera parameters in EXIF headers) included by the cameras. This metadata often does not provide enough information to determine location information (e.g., GPS coordinates) and associated camera pose (e.g., field of view) for each captured image.

A reliable source of information for location information and camera poses may be captured by the UAV computer processing system flight logs. The flight logs may store GPS and INS (inertial navigation system) data used for camera pose calculation in regular intervals. These flight logs may store "image taken" times (e.g., described above with respect to block 408), indicating a time at which associated images were taken during a survey (e.g., a flight plan). This configuration creates the situation of using two different sources of timestamp information, flight logs generated by the UAV computer processing system, and image files from a separate camera, to generate imagery mapped to a real-world coordinate frame (e.g., geo-rectified imagery).

An example approach to the above problem would be to use metadata timestamps (e.g., EXIF information) in the image files, and match them (e.g., correlate the timestamps) with the closest flight log timestamp in absolute terms. Flight log timestamps (e.g., which can be based on GPS timestamps) can generally be considered accurate to a high degree. However, camera clocks have no guarantee to be accurate, and are subject to clock skew, as such timestamps included in EXIF information can be incorrect. In a photo survey taking 1 image per second, even a 1 second skew in the camera clock would mean this matching would result in wrong geospatial coordinates and camera poses for all images. Camera clocks are not synced to a central source regularly, so a clock skew of 1 or more seconds is very likely, which makes this solution less than precise.

Another example approach would be to process the flight log, and the list of images together via a computer processing system (e.g., the outside system described above). For example, the process may start from the first image file and the first "image taken" log entry (e.g., described above with reference to FIG. 4), and assume that these correspond to each other. Next, location information (e.g., GPS coordinates) can be assigned to the first image file by obtaining location information at the "image taken" log entry time, and camera pose information for the first image file can be determined. Subsequently, the next image file and the next "image taken" log entry are utilized until either images or log entries run out. While an improvement over the previous approach, this approach is brittle, because both flight logs and image files are lossy. An image file from the camera may not have a corresponding UAV "image taken" log entry, because of problems that can occur at numerous parts of the system, which can cause log messages not to be received, or even if they are received to not be written (e.g., stored in memory) successfully. Similarly, an "image taken" log entry may not have a corresponding image file from the camera, because the camera may fail to take an image after being triggered, or fail to store the image in memory (e.g., onboard camera memory). What makes this brittleness more challenging is that every match after a missing image or log event may then be incorrect. Consequently if an image or log event is missing from the beginning of the survey, every image after this miss will be matched with the wrong location information and camera pose.

As will be described below in FIG. 8, an improvement over the two above described approaches is recited. The example process 800 describes a precise approach that correlates "image taken" timestamps stored in log data (e.g., flight logs) with timestamps included in image metadata (e.g., EXIF headers). In this way, the process 800 can precisely determine location information that corresponds with each captured image, and can provide a degree of robustness that cancels out user error (e.g., user error in setting a camera clock), which has not previously been attainable.

Figure 8:
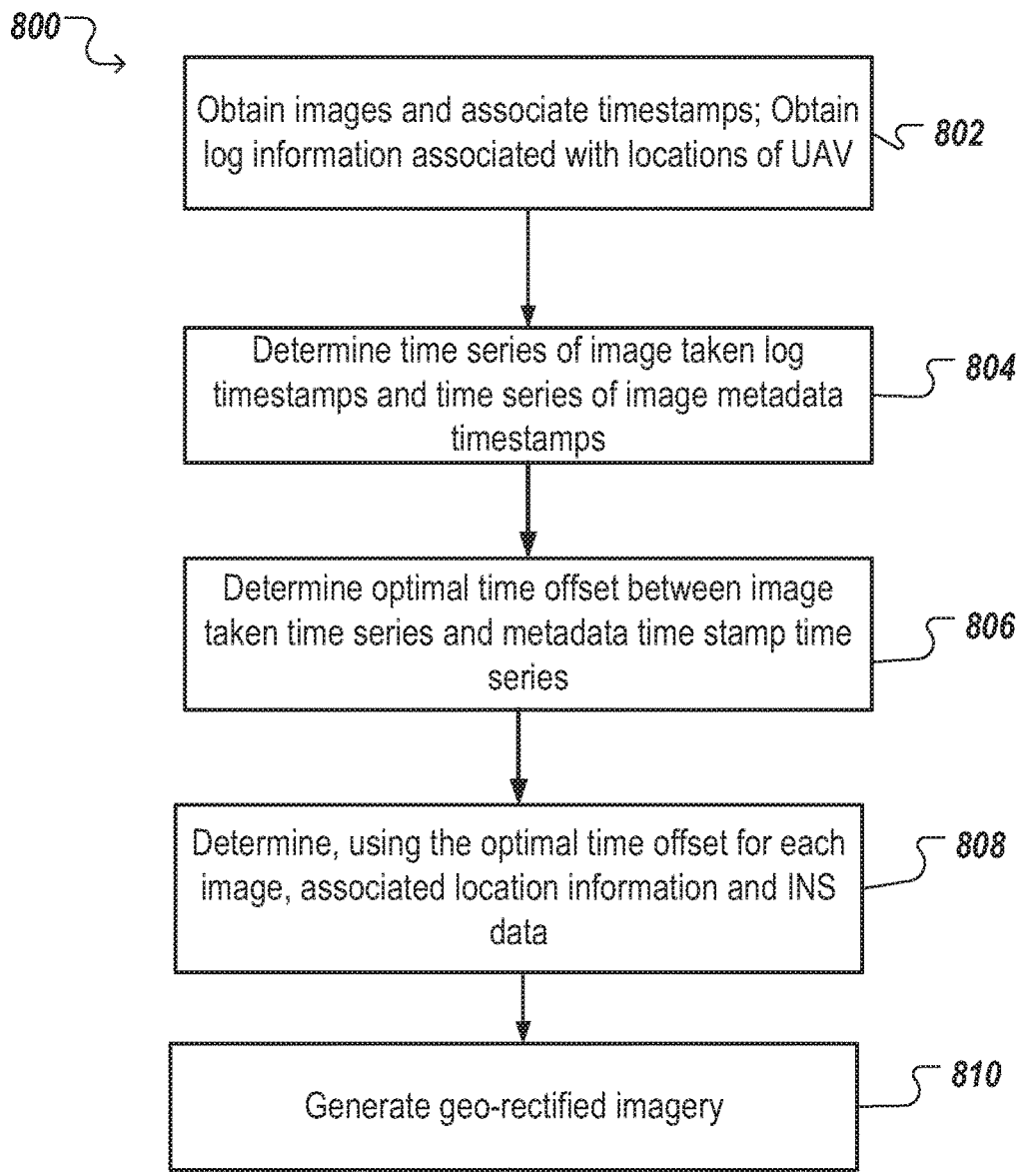
FIG. 8 is a flowchart of an example process for correlating timestamps of images.

FIG. 8 is a flowchart of an example process for correlating timestamps of images. For convenience, the process 800 will be described as being performed by a system of one or more computers (e.g., the outside system described above, or the user device of an operator described above).

The system obtains images and associated timestamps along with location information of an unmanned aerial vehicle (UAV) (block 802). As described above, with reference to FIG. 4, a UAV implementing a flight plan can trigger a camera to capture one or more images, and can store metadata associated with each "image taken" event in one or more logs that indicates an "image taken" timestamp associated with the image being captured. For instance, UAV (e.g., an included hardware module 12 or autopilot system 16 as described above in FIG. 1) can log a camera trigger event, the time the event was triggered, and geospatial information (e.g., location information) when the camera was provided the information (e.g., a pulse, a data message) indicating capture of an image. The logs can further include location information (e.g., GPS coordinates) and inertial navigation system data (INS) describing motion, rotation, information of the UAV, that are associated with timestamps. However, the timestamps associated with location information and INS data can be decoupled from the "image taken" timestamps, since the UAV can periodically determine its location and INS data separate from when images are triggered.

Similarly, as indicated above, the camera that captures the imagery can include metadata (e.g., EXIF headers) that indicates a timestamp as recorded by the camera. The system obtains the images from the UAV, or a user device in communication with the UAV, and analyzes the obtained images to obtain metadata timestamps.

The system generates a time series of "image taken" timestamps and a time series of metadata timestamps (e.g., timestamps included in EXIF headers) (block 804). The system obtains the different types of timestamps, "image taken" timestamps and metadata timestamps, and creates a respective time series for each type (e.g., an ordered time series). That is, the time series can be a discrete valued function, with each element of the discrete valued function being a particular timestamp.

The system determines an optimal time offset between the "image taken" time series and the metadata timestamp time series (block 806). To determine metadata timestamps of captured images that correspond to "image taken" timestamps indicated in logs (e.g., flight logs), the system determines a time offset that best matches metadata timestamps (e.g., timestamps included in actual images) with "image taken" timestamps included in the logs. In this way, the system can account for the difference in clock times between the UAV (e.g., a GPS clock) and the camera, and correctly identify a timestamp, as recorded by the UAV, that corresponds to each image captured by the camera. As will be described, after determining the optimal time offset, the system can obtain associated location information (e.g., GPS coordinates) and inertial navigation system data (INS) for use in generating geo-rectified imagery.

The system defines an initial offset as a time difference of a clock included in the UAV (e.g., a GPS clock) and the camera clock, and steps through variations of offsets until arriving at an optimal offset that best correlates between the two types of time series.

For instance, the system defines the initial offset as being a particular value (e.g., 0 seconds, 5 ms, 10 ms), and performs a convolution of the two time series using the offset. That is, the system can perform a correlation (e.g., a cross-correlation) with one of the time-series shifted in time (e.g., the system subtracts or adds the initial offset), and obtains a result from the correlation indicating a measure of similarity between the two time series.

Subsequently, the system updates the initial offset with a value (e.g., 5 ms, 10 ms, 15 ms), and perform the correlation again. The system proceeds until a stopping criterion is reached, which can include the updated offset reaching a threshold (e.g., 1 second, 2 seconds). The system determines, using the results of each correlation, an optimal time offset indicating that, with the optimal time offset, the metadata timestamps and the "image taken" timestamps were the most correlated.

Optionally, if there are multiple offset values that result in the same, or within a threshold percentage, measure of similarity, the system can utilize an "error" metric to select the optimal time offset. For instance, the system can define the "error" metric as the sum of the squares of the differences between each "image taken" event and each metadata timestamp, and can select the offset that minimizes the error.

Alternatively, the system can utilize each offset to directly add, or subtract, from a "metadata" timestamp, and determine whether there is a matching "image taken" timestamp in the logs. The system can select the optimal time offset as the time offset that results in the greatest number of matches.

Optionally, the system can determine multiple optimal time offsets, with each optimal time offset being relevant to a particular range of timestamps in the time series. For instance, a first threshold number of time stamps in both the metadata time series and the "image taken" time series can be associated with a first optimal time offset. Additionally, the optimal time offset can be a real valued function that correlates between the two types of time series.

Optionally, the process can introduce a preliminary step to initially cluster all "image taken" events together which are separated by less than 2×(photo survey camera trigger interval) (e.g., a periodic amount of time at which the UAV is to trigger the camera). Then, the system can utilize the range of these clusters of "image taken" events with metadata timestamps to perform an initial quick match, and identify a rough estimate of the optimal offset from which to start the initial offset. During the correlation process, the system can search outward (e.g., forward and backward) from the initial offset.

Optionally, the potential range of valid offset values can be from (min "image taken" timestamp—max metadata timestamp) to (max "image taken" timestamp—min metadta timestamp). This time range could potentially require hundreds of thousands or millions of iterations at 10 ms intervals.

However, a reduction in this time range can be made as the system identifies offset values that match images (e.g., correlate between the two types of time series), by eliminating offset values from the ends of this range equal to the "best match" found so far, because it's not possible to beat the best match if certain values are completely outside the range of the other values. This can allow, over time, the system to reduce the possible range of offsets as the system nears a perfect match, such that the size of the range approaches zero.

The system determines, for each image, associated location information and INS data (block 808). As described above, the optimal time offset identifies a time offset between metadata timestamps and "image taken" timestamps stored in log data. To generate a geo-rectified image, the system also utilizes location information and INS data associated with each image to determine a camera pose (e.g., field of view). However, since the UAV can record location information and INS data separately from recording "image taken" timestamps, a particular "image taken" timestamp might not also have associated location information and INS data. That is, the UAV can record location information and INS data periodically (e.g., at a particular frequency), which is not dependent on when the camera is capturing images.

Therefore, to determine location information and INS data associated with each image, the system estimates a location (e.g., GPS coordinate) at which the image was captured along with estimated INS data. As described above, with reference to block 408, the UAV can increase a frequency at which it determines location information and INS data after providing information to the camera to capture an image. Therefore, the system can have highly detailed location information and INS data to utilize when estimating location and INS data for each image.

To estimate location information and INS data for a particular image, the system utilizes the optimal time offset and metadata timestamp of the particular image to calculate a corresponding "image taken" timestamp for the particular image. The system can extrapolate data to find the coordinate and INS estimate from adjacent samples of GPS and INS data. Since, as described above, there might not be location information and INS data for the corresponding "image taken" timestamp (e.g., within a threshold amount of time from the "image taken" timestamp), the system estimates location information and INS data. The system determines one or more closest timestamps associated with location information and INS data measurements that are prior to the corresponding "image taken" timestamp, and one or more closest timestamps associated with location information and INS data measurements that are subsequent to the corresponding "image taken" timestamp. Therefore, the system obtains location and INS data from timestamps surrounding the corresponding "image taken" timestamp. Utilizing the obtained location and INS data, the system estimates a location of the UAV at which the particular image was captured, along with INS data at a time at which the particular image was captured.

For instance, if the metadata timestamp of the particular image is indicated as being 1455050791089 milliseconds (e.g., UNIX time), and the optimal time offset is +10 ms, the system can identify two timestamps included in location and INS logs that are directly subsequent to, and prior to, the particular timestamp with the time offset (e.g., 1455050791099 ms). The system obtains location information and INS data for the two timestamps, and using the obtained data, determines estimated location information (e.g., an estimated GPS coordinate at which the UAV was located when the particular image was captured) and INS data.

The system generates geo-rectified imagery (block 810). After determining location information and INS data for each image, the system generates geo-rectified imagery (e.g., for presentation to a user).

As described above, the system utilizes "image taken" timestamps. Additionally, the system can utilize "trigger image" times (e.g., described in block 406), in addition to "image taken" timestamps of when the camera was actually activated (e.g., described in block 408). In cases where the "image taken" detection fails, "trigger image" can be used to backfill "image taken" times with a rough estimate.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method performed by an unmanned aerial vehicle (UAV) comprising one or more processors, the method comprising:
    obtaining information describing a flight plan for implementation, the flight plan including one or more way points that trigger a camera of the UAV to capture images;
    recording flight log data including geospatial locations of the UAV and a time at which the camera was triggered to capture the images;
    determining a geospatial location for at least one image of the images by:
        determining a time offset between a timestamp associated with the at least one image and a timestamp included in the flight log data,
        identifying, based on the time offset, a subset of the geospatial locations of the UAV at timestamps adjacent to the timestamp included in the flight log data that corresponds to the timestamp associated with the at least one image, and
        determining, using the subset of the geospatial locations of the UAV, the geospatial location for the at least one image; and
    providing, to a user device in communication with the UAV, information indicating that the camera captured the images, wherein the user device monitors the UAV during implementation of the flight plan.

2. The method of claim 1, further comprising:
    obtaining information identifying a ground sampling distance, the ground sampling distance indicating a minimum acceptable number of image pixels per distance;
    determining, based on the ground sampling distance and information describing capabilities of the camera, a minimum altitude of the UAV that will allow one or more of the images to include the ground sampling distance;
    obtaining an altitude of the UAV while the one or more of the images was captured; and
    determining that the obtained altitude is greater than the minimum altitude, and determining to recapture the one or more of the images.

3. The method of claim 1, further comprising:
    determining, that while one or more of the images was captured, the UAV moved greater than a threshold distance; and
    determining to recapture the one or more of the images.

4. The method of claim 1, further comprising:
    determining one or more quality scores associated with one or more of the images, wherein a given quality score comprises a measure of a respective measures of quality of the one or more of the images; and
    determining that at least one quality score is less than an acceptable threshold, and determining to recapture the one or more of the images.

5. The method of claim 4, wherein a measure of quality comprises a measure of sharpness of the one or more of the images, a measure of blurriness of the one or more of the images, a measure of overlap between the one or more of the images and one or more prior images, a measure of exposure of the one or more of the images, a measure of contrast of the one or more of the images, or any combination thereof.

6. The method of claim 1, further comprising:
    generating a reduced quality version of one or more of the images; and
    providing, to the user device, the reduced quality version of the one or more of the images for presentation on the user device.

7. The method of claim 6, further comprising:
    receiving, from the user device, information describing that the one or more of the images is to be recaptured, wherein a user of the user device indicates that the one or more of the images is unacceptable, or the user device determines that at least one quality score associated with the one or more of the images is below an acceptable threshold.

8. The method of claim 6, further comprising:
    receiving, from the user device, a request for the one or more of the images as captured by the camera;
    providing the one or more of the images to the user device; and
    receiving, from the user device, information indicating recapture of the one or more of the images.

9. The method of claim 1, wherein a trigger comprises a location at which the UAV is to capture one or more of the images, a time at which the UAV is to capture one or more of the images, a determination to recapture one or more of the images, or receipt of information from the user device indicating that the UAV is to capture, or recapture, one or more of the images.

10. The method of claim 1, further comprising:
in response to providing information indicating that the camera is to capture one or more of the images, obtaining location information of the UAV, and associating the location information with one or more timestamps; and
providing, at a completion of the flight plan to an outside system, the one or more of the images, associated timestamps, and associated location information for processing by the outside system.

11. A computer-implemented method comprising:
obtaining images and log data associated with an unmanned aerial vehicle (UAV) implementing a flight plan, each image being captured by a camera of the UAV and including metadata, generated by the camera, indicating a timestamp at which the camera captured the image, and the log data including image capture timestamps associated with the UAV receiving information, from the camera, identifying that images were captured along with timestamps associated with determined location information of the UAV and inertial navigation system (INS) data of the UAV;
determining a time series of metadata timestamps and a time series of image capture timestamps;
determining an optimal time offset between the time series of metadata timestamps and the time series of image capture timestamps, the optimal time offset indicating, for one or more images, a difference in value between respective metadata timestamps and corresponding image capture timestamps;
determining, using the optimal time offset for each obtained image, estimated location information of the UAV and INS data of the UAV when the image was captured; and
generating geo-rectified imagery from the obtained images and associated location information of the UAV and INS data of the UAV.

12. The computer-implemented method of claim 11, wherein determining an optimal time offset comprises:
assigning an initial time offset, and performing a correlation between the time series of metadata timestamps and the time series of image capture timestamps using the initial time offset; and
updating the initial time offset by one or more values, and performing the correlation, for each updated time offset; and
assigning the updated time offset that results in a greater correlation as the optimal time offset.

13. The computer-implemented method of claim 11, wherein determining an optimal time offset comprises:
for one or more time offsets applied to the time series of metadata timestamps, determining the optimal time offset as the time offset that matches a greatest number of metadata timestamps to image captured timestamps.

14. An unmanned aerial vehicle (UAV) system comprising one or more computers and one or more non-transitory computer storage media storing instructions that are operable, when executed by the one or more computers, to cause the one or more computers to perform the operations comprising:
receiving a flight plan, the flight plan including one or more way points;
navigating the UAV along the one or more way points according to the received flight plan;
at least at one of the way points, triggering a camera to capture digital images;
recording flight log data comprising at least, geospatial location of the UAV and a time at which the camera was triggered; and
determining a geospatial location for one or more of the digital images by determining an optimal time offset between timestamps associated with the one or more digital images and timestamps included in the flight log data, identifying, using the optimal time offset and a particular timestamp associated with a particular digital image, geospatial locations of the UAV at timestamps adjacent to a timestamp included in the flight log data that corresponds to the particular timestamp, and determining, using the identified geospatial locations, an estimated geospatial location for the particular digital image.

15. The system of claim 14, wherein the operations further comprise:
obtaining information identifying a ground sampling distance, the ground sampling distance indicating a minimum acceptable number of image pixels per distance;
determining, using the ground sampling distance and information describing capabilities of the camera, a minimum altitude of the UAV that will allow captured images to include the ground sampling distance;
obtaining an altitude of the UAV while the digital image was captured; and
determining that the obtained altitude is greater than the minimum altitude, and determining that the digital image is to be re-captured.

16. The system of claim 14, wherein a trigger comprises a location at which the UAV is to capture an image, a time at which the UAV is to capture an image, a determination to re-capture an image, or receipt of information from a user device in wireless communication with the UAV indicating that the UAV is to capture, or re-capture, an image.

17. A system comprising one or more computers and one or more non-transitory computer storage media storing instructions that are operable, when executed by the one or more computers, to cause the one or more computer to perform the operations comprising:
receiving a flight plan including one or more waypoints for navigating an unmanned aerial vehicle (UAV) along the one or more waypoints according to the flight plan, wherein the waypoints include associated information to trigger a camera to capture one or more digital images;
transmitting the flight plan to a UAV computer system;
receiving UAV flight log data comprising at least, geospatial location of the UAV and a timestamp at which the camera was triggered;
receiving digital images taken by the camera, wherein the digital images have an associated timestamp when the image was taken; and
determining a geospatial location for one or more of the digital images by determining an optimal time offset between timestamps associated with the one or more digital images and timestamps included in the flight log data, the optimal time offset indicating a difference in timestamp value between timestamps associated with digital images and corresponding timestamps included in the flight log data, identifying, using the optimal time offset and a particular timestamp associated with a particular digital image, geospatial locations of the UAV at timestamps adjacent to a timestamp included in the flight log data that corresponds to the particular timestamp, and determining, using the identified geospatial locations, an estimated geospatial location for the particular digital image.

18. The system of claim 17, wherein the identified geospatial locations are geospatial locations at a closest timestamp prior to the timestamp included in the flight log data that corresponds to the particular timestamp and a closest timestamp subsequent to the timestamp included in the flight log data that corresponds to the particular timestamp.

19. The system of claim 17, wherein the geospatial locations of the UAV are associated with respective periodic timestamps.

* * * * *